United States Patent
Olsson et al.

(12) United States Patent (10) Patent No.: US 7,602,866 B2
Olsson et al. (45) Date of Patent: Oct. 13, 2009

(54) SIGNAL RECEIVER DEVICES AND METHODS

(75) Inventors: Magnus Olsson, Kilafors (SE); Huseyin Arslan, Morrisville, NC (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 807 days.

(21) Appl. No.: 10/506,035

(22) PCT Filed: May 31, 2002

(86) PCT No.: PCT/SE02/01050

§ 371 (c)(1),
(2), (4) Date: Aug. 30, 2004

(87) PCT Pub. No.: WO03/073630

PCT Pub. Date: Sep. 4, 2003

(65) Prior Publication Data

US 2005/0111596 A1 May 26, 2005

Related U.S. Application Data

(60) Provisional application No. 60/359,911, filed on Feb. 28, 2002.

(51) Int. Cl.
*H03D 1/04* (2006.01)
(52) U.S. Cl. .................. 375/346; 327/310; 327/384; 327/551; 348/607; 375/285; 375/147; 375/316; 375/317; 455/296
(58) Field of Classification Search ............ 375/346
See application file for complete search history.

(56) References Cited

U.S. PATENT DOCUMENTS 6,067,333 A  5/2000 Kim et al.

(Continued)

FOREIGN PATENT DOCUMENTS

EP    0696856    8/1995

(Continued)

OTHER PUBLICATIONS

Laurent, Exact and Approximate Construction of Digital Phase Modulations by Superposition of Amplitude Modulated Pulses (AMP), IEEE Transactions on Communications, vol. Com 34, No. 2, Feb. 1986, pp. 150-160.

(Continued)

*Primary Examiner*—Shuwang Liu
*Assistant Examiner*—Dhaval Patel
(74) *Attorney, Agent, or Firm*—Nixon & Vanderhye P.C.

(57) ABSTRACT

A method/apparatus is provided that detects impairment in a received signal and employs the structure in the receiver that is designed for that purpose. Preferably, the method/apparatus detects the interferer modulation and employs the structure in the receiver that is designed for that purpose. The detection is preferably performed using a quality measure, e.g., the residual errors after channel estimation or SNR (signal-to-noise-ratio) estimates after channel estimation. Preferably, hypothesis tests, threshold schemes, or schemes where the threshold is adapted according to one of the measures are used. The receiver selects between an interference rejection method and a conventional receiver or selects between an interference rejection method and a less powerful interference rejection method, or a combination thereof.

43 Claims, 10 Drawing Sheets

U.S. PATENT DOCUMENTS

| | | | |
|---|---|---|---|
| 6,128,355 A * | 10/2000 | Backman et al. | 375/347 |
| 6,131,013 A | 10/2000 | Bergstrom et al. | |
| 6,175,587 B1 | 1/2001 | Madhow et al. | |
| 6,470,047 B1 * | 10/2002 | Kleinerman et al. | 375/232 |
| 7,031,411 B2 * | 4/2006 | Arslan et al. | 375/346 |
| 7,092,463 B1 * | 8/2006 | Cedervall et al. | 375/346 |
| 7,203,249 B2 * | 4/2007 | Raleigh et al. | 375/299 |
| 2003/0063596 A1 * | 4/2003 | Arslan et al. | 370/347 |
| 2006/0056549 A1 * | 3/2006 | Arslan et al. | 375/346 |

FOREIGN PATENT DOCUMENTS

| | | |
|---|---|---|
| EP | 0967734 | 6/1999 |
| WO | WO00/64061 | 10/2000 |
| WO | WO02/23742 | 3/2002 |

OTHER PUBLICATIONS

Jung, "Laurent's Representation of Binary Digital Continuous Phase Modulated Signals with Modulation Index 1/2 Revisited", IEEE Transactions on Communications, vol. 42, No. 2/3/4, Feb./Mar. Apr. 1994. pp. 221-224.

Arslan et al, "Cochannel Interference Suppression with Successive Cancellation in Narrow-Band Systems", IEEE Communications Lettes. vol. 5, No. 2, Feb. 2001, pp. 37-39.

Arslan et al, "New Approaches to Adjacent Channel Interference Suppression in FDMA/TDMA Mobile Radio Systems", IEEE Transactions on Vehicular Technology, vol. 49, No. 4, Jul. 2000, pp. 1126-1139.

Hui et al, "An Adaptive Maximum-Likelihood Receiver for Colored Noise and Interference", Ericsson, Inc. USA, pp. 2257-2261, Aug. 2002.

Bottomley et al, "Adaptive Arrays and MLSE Equalization", Ericsson, Inc. USA and Ericsson Radio Systems AB, Swe3den, pp. 50-54, Jul. 1995.

Karlsson et al, "Interference Rejection Combining for GSM", Ericsson Radio Systems AB, Sweden, pp. 433-437, Sep. 1996.

A3ztély et al, "MLSWE and Spatio-Temporal Interference Rejection Combining with Antenna Arrays", Royal Institute of Technology, Sweden, pp. 1341-1344, May 2002.

\* cited by examiner

SIGNAL RECEIVER DEVICES AND METHODS

This application is the U.S. national phase of international application PCT/SE02/01050 filed 31 May 2002 which designated the U.S. and claims benefit of U.S. Provisional Application Ser. No. 60/359,911, dated 28 Feb. 2002, the entire content of which is hereby incorporated by reference.

TECHNICAL FIELD

The present invention relates in general to methods and devices of digital communication systems, and in particular to interference rejection in such systems.

RELATED ART

In most wireless digital communication systems the receivers are designed mainly to combat distortion caused by the communication channel and noise, while the effects of interference are neglected. This causes the receivers to work poorly when the level of interference is high. Many cellular systems are now designed to be interference limited to maximize spectral efficiency. Hence, introduction of receivers with some interference rejection capabilities typically improves the receiver performance. Furthermore, it becomes also possible to tighten the frequency reuse of the system and thereby further increase the system capacity and the spectral efficiency in the systems.

In recent years, receivers that also combat interference have been developed. Several interference rejection techniques, both for single antenna and multiple antenna receivers, have been studied extensively for wireless communication systems.

Multi-user detection techniques, which demodulate both desired and interfering signals at the receiver, are powerful methods to separate the desired user's information from the interferers. Some examples of these techniques, presented in e.g. [1, 2], are joint demodulation and successive cancellation. However, multi-user detection techniques are commonly only considered for base-stations as they are complex in both radio and baseband signal processing.

Adaptive joint demodulation is disclosed in [10]. The adaptive receiver includes both a complex joint demodulation unit and a simpler conventional demodulation unit.

The received signal is evaluated over the training sequence to make a decision about which demodulation to use over the data. Several parameters are measured and/or calculated for the control process. Signal-to-noise-ratio estimation, dispersion level estimation, Doppler spread value estimation, and existence of dominant interference estimation are some of the parameters that are used for decision making. However, the adaptive joint demodulation given in [10] assumes for example that both desired and interfering signals use the same modulation.

Whitening (or some sort of filtering) of the interfering signal (along with the desired signal) is considered to combat interference. Filtering in the time domain, so-called temporal whitening, as presented in e.g. [3], is one example of whitening. Filtering in the spatial domain with multiple antenna receivers, spatial whitening or Interference Rejection Combining (IRC), as presented e.g. in [4, 5], are some other examples of whitening. Joint spatial and temporal whitening has also been studied for multiple antenna receivers, see e.g. [6].

The method described in [7], which in the present disclosure will be denoted Single Antenna Interference Rejection (SAIR), exploits the inherent constellation structure of one-dimensionally modulated signals combined with whitening. It is more recently considered as a powerful way of canceling dominant one-dimensionally modulated interferers.

All these techniques give more or less significant improvements in receiver performance that might make it possible to improve system capacity and increase the spectral efficiency in the systems.

However, the interference rejection methods of prior art suffer from some problems. In order to obtain the significant improvements in interference limited environments, the interference rejection techniques are often designed under model assumptions for specific scenarios. One major problem in this context is that in scenarios where these model assumptions are not true, the performance of the receivers might instead deteriorate. One example is that interference rejection methods might work poorly in noise limited environments, i.e. when no interference is present. Another example is that some of the interference rejection methods, e.g. SAIR, are designed for certain modulation schemes by utilizing the inherent constellation structure of the modulation scheme. This is no problem in systems that use one modulation scheme all the time, e.g. GSM/GPRS (Global System for Mobile communications/General Packet Radio Services). For systems that utilize more than one modulation scheme, e.g. the evolution of GSM/GPRS, which is called EDGE (Enhanced Data rates for Global Evolution), there is, however, a problem. When the modulation scheme of the carrier and interferer do not fulfill the assumptions under which the interference rejection method was designed, the performance of the interference rejection receiver might in certain cases deteriorate, and even be worse than a conventional receiver without interference rejection capabilities.

As an example to illustrate this, an EDGE system can be examined, which utilizes both the GMSK— (Gaussian Minimum-Shift Keying) and the 8PSK-modulation (8 Phase Shift Keying). Assume that we have a GMSK-receiver equipped with SAIR. The basic idea of the SAIR algorithm is to estimate the I/Q correlation, i.e. correlation between in-phase and quadrature components of the signal, during the training sequence and then remove it during the rest of the burst. This works for one-dimensional modulation schemes since in that case the I/Q correlation is about the same over the entire burst. The GMSK modulation scheme can be viewed as one-dimensional, see e.g. [8, 9], while the 8PSK modulation scheme is two-dimensional. Hence, when both the carrier signal and the interferer signal are GMSK-modulated, there is no problem. On the other hand, when the interference is 8PSK-modulated, i.e. a two-dimensional modulation scheme, one of the main assumptions that SAIR is based on is broken, namely the one-dimensionality of the signals that makes the I/Q correlation about the same over the entire burst. This is since the 8PSK-modulation causes the I/Q correlation to rotate continuously. Hence, with 8PSK-modulated interference it is not possible to estimate the I/Q correlation accurately during the training sequence, and, consequently, trying to remove it during the rest of the burst degrades the overall performance.

SUMMARY

A general object is to provide methods, devices and systems for more robust interference rejection. A further object is to provide methods, devices and systems for detecting the character of the impairment in the received signal.

The above objects are achieved by methods, devices and systems according to the present disclosure. In general words, a method/device/system is provided that detects the nature of an impairment in the received signal and selects a structure in the receiver that is designed for that purpose. Preferably, the method/device/system detects the modulation of an interfering signal and employs a structure in the receiver that is designed for that particular modulation. The detection is performed using a quality measure, e.g. the residual errors or SNR (signal-to-noise-ratio) estimates after performing one alternative of an interference rejection procedure on at least a part of the received signal. The present invention involves preferably hypothesis tests, threshold schemes, or schemes where the threshold is adapted according to one of the measures. According to one embodiment, the operation in the receiver is that it selects between a powerful interference rejection method and an operation as a conventional receiver. According to another embodiment, the receiver selects between a powerful interference rejection method and a less powerful interference rejection method. Preferably, the powerful interference rejection method is SAIR. Combinations thereof are also useful. Preferably, the method/apparatus is applied in GSM/EDGE radio receivers.

DETAILED DESCRIPTION

A central concept is to select an interference rejection procedure, if any at all, which is well suited for the present impairment situation. In the present disclosure, the term "interference rejection" also refers to terms such as interference suppression and other techniques that aim to or result in a combat of interfering signals. Interference rejection is thus applied in a dynamic way. In order to achieve such a dynamic behavior, the receiver has to be provided with suitable information about the type and strength of impairment present in the received signal. Such impairment information can be explicit, for example via signaling of some kind of system information, or it can be detected blindly from the received communication signal.

A solution to the problem of blindly detecting the impairment in the received signal is to utilize the fact that a typical interference rejection method works well when the received signal has the interference characteristics that the interference rejection method is designed for. Employment of the interference rejection method over at least a part of the actual received signal, e.g. the training sequence, will in such a case give a manipulated signal having a significantly reduced interference content compared to the original signal. On the other hand, if the received signal does not have the intended interference characteristics, the signal manipulated by the interference rejection method will have an interference content of essentially the same magnitude as in the original signal. In some cases, the situation may even deteriorate. This circumstance can, however, be utilized to design a decision device for finding a suitable interference rejection method. In this way, gains in the interference scenarios the interference rejection method was designed for are still achieved, while the performance is at least not degraded in other scenarios.

In other words, an interference rejection method is applied in blind on at least a part of a received signal. If the result of the interference rejection is encouraging enough, it is concluded that the interference rejection was the appropriate one to apply. Otherwise another interference rejection approach is selected. The decision is thus made after a "preliminary" interference rejection has taken place. For applying such a scheme, at least three components are necessary: at least one interference rejection method, a quality measure and a selection method. Different embodiments will be discussed below as examples of different designs. The illustrated embodiments should, however, not be considered to limit to the interpretation of the claims.

Figure 1:
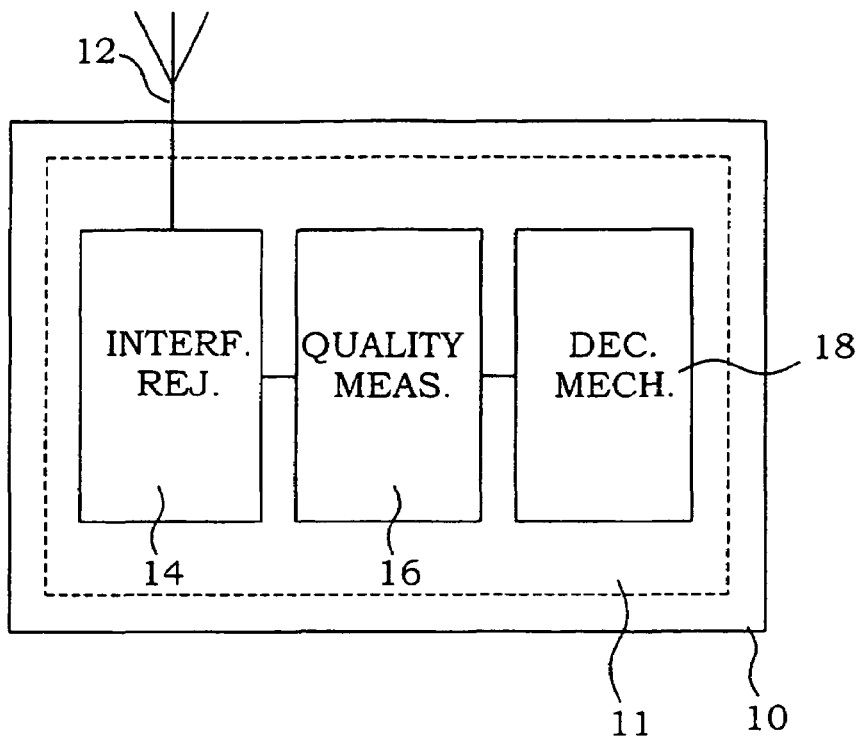
FIG. 1 is a block diagram of an embodiment of a general receiver.

In FIG. 1, a schematic illustration of the basic components of a receiver 10 is illustrated. The receiver 10 comprises a signal interface to the surroundings, in the figure illustrated as an antenna 12. The signal could, however, be transferred from a radio signal into an electrical or optical, digital or analogue, signal outside the receiver 10 and/or the signal being brought to the receiver 10 as a pure electrical or optical signal. The signal is provided to an interference rejector 14, which performs an interference rejection procedure on at least a part of the received signal. This manipulated signal is forwarded to a quality measure detector 16, where the interference or impairment situation of the manipulated signal is detected. Based on the obtained quality measure, a decision mechanism 18 is controlled, which selects a suitable interference rejection procedure for the entire signal. The decision mechanism 18 operates as a control section for an interference rejection section 11. The means in the receiver are typically implemented in a processor or hardware, i.e. a processing means of some kind.

Figure 2:
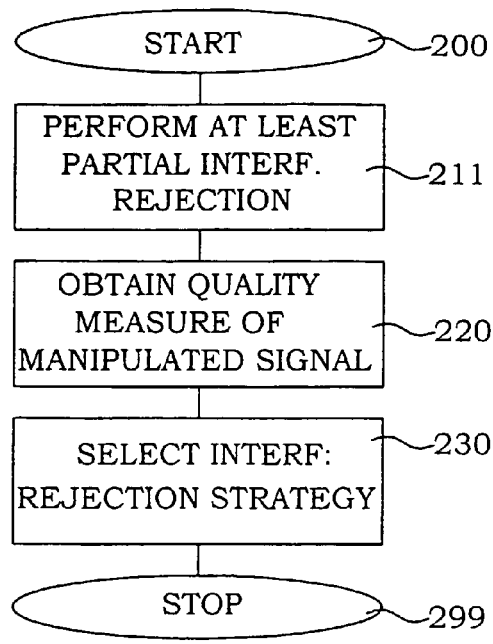
FIG. 2 is a flow diagram of an embodiment of a general method.

A corresponding flow diagram is illustrated in FIG. 2. The procedure starts in step 200. In step 210, an interference rejection procedure is performed on at least a part of a signal. In step 220, a quality measure representing the interference or impairment situation of the manipulated signal is obtained. An interference rejection strategy is subsequently selected in step 230 based on the obtained quality measure. The procedure ends in step 299.

Figure 3:
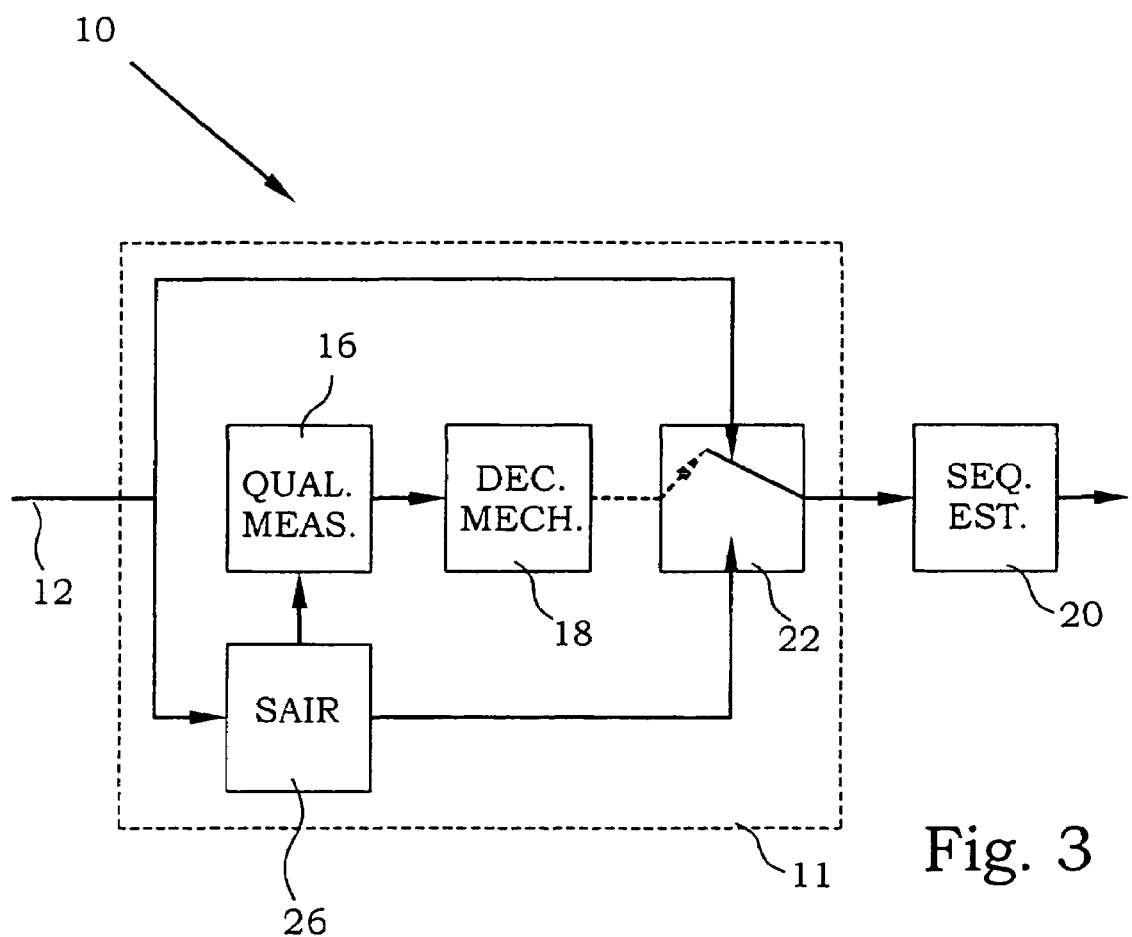
FIG. 3 is a block diagram of an embodiment of a receiver having one interference rejector.

A first embodiment of a receiver 10 is illustrated in FIG. 3. A signal is received in an interference rejection section 11 at a receiving interface 12. The signal is provided to a SAIR section 26, where a SAIR procedure is applied to the received signal. The manipulated signal is provided both to a quality measure detector 16 and a switch 22. The quality measure detector 16 is in this particular embodiment provided with means for estimating a ratio between the signal and the sum of noise and interference.

The quality measure of the manipulated signals is provided to a decision mechanism 18. In this embodiment, the decision mechanism simply compares the quality measures with a threshold value. If the quality measure is better than the threshold, it is assumed that the interference signal is of e.g. a GMSK type where SAIR is efficient. The decision mechanism 18 sends a control signal to the switch 22, for connection of the manipulated signal terminal according to the decision. If, on the other hand, the quality measure is bad, SAIR is probably not the proper interference rejection choice, and instead, the original non-manipulated signal is connected in the switch 22. The selected signal is subsequently brought further e.g. to a sequence estimation device 20.

Figure 4:
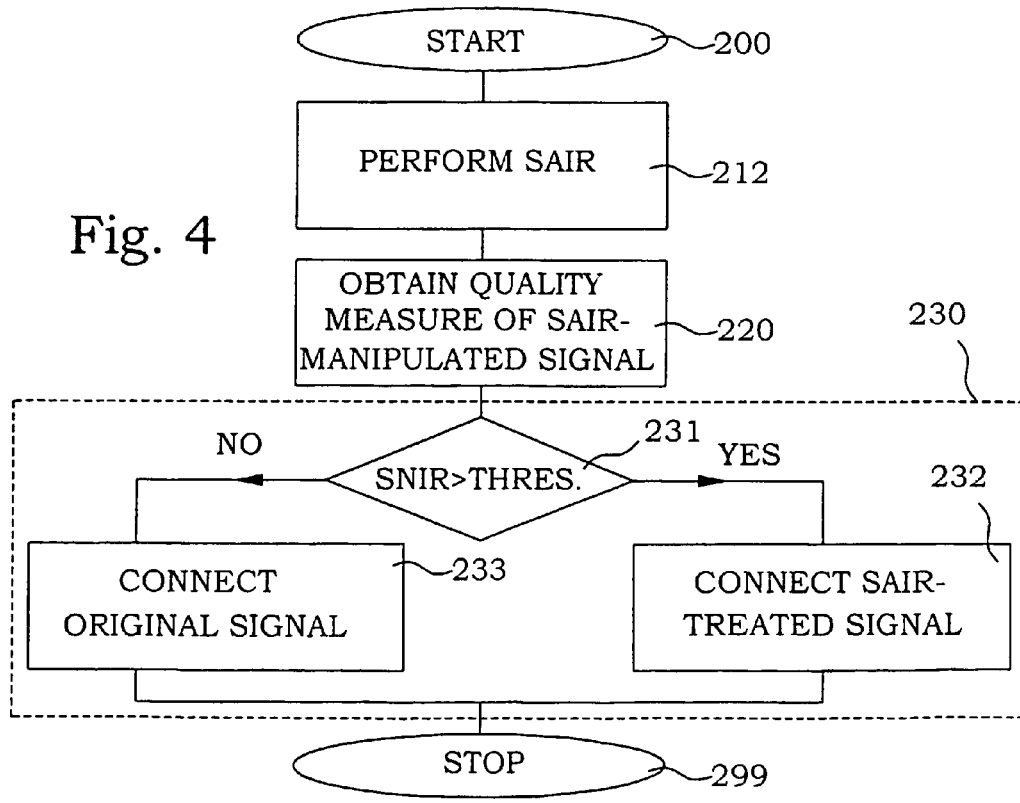
FIG. 4 is a flow diagram of an embodiment of a method used with the embodiment of FIG. 3.

A corresponding flow diagram is illustrated in FIG. 4. The procedure starts in step 200. In step 212, an interference rejection procedure according to SAIR is performed on the entire received signal. In step 220, a quality measure of the manipulated signal is obtained. In step 231, the quality measure is compared with a threshold. If the quality measure is better than the threshold, the manipulated signal is connected to be brought further within the receiver in step 232. Otherwise the original signal is connected in step 233. Steps 231 to 233 can be viewed as part steps to the interference rejection strategy of step 230 of FIG. 2. The procedure ends in step 299.

In this first embodiment, the quality measure is used to switch on and switch off the interference rejection procedure. However, the entire interference rejection procedure is anyway performed on the entire signal. The actual selection is thus performed after the interference rejection. If the choice is not to use the interference rejection, the manipulated signal is just wasted, which also means that unnecessarily high processor capacity is used. Furthermore, if the originally received signal already has a quality that is better than the threshold, the interference rejection procedure is performed without being necessary at all.

Figure 5:
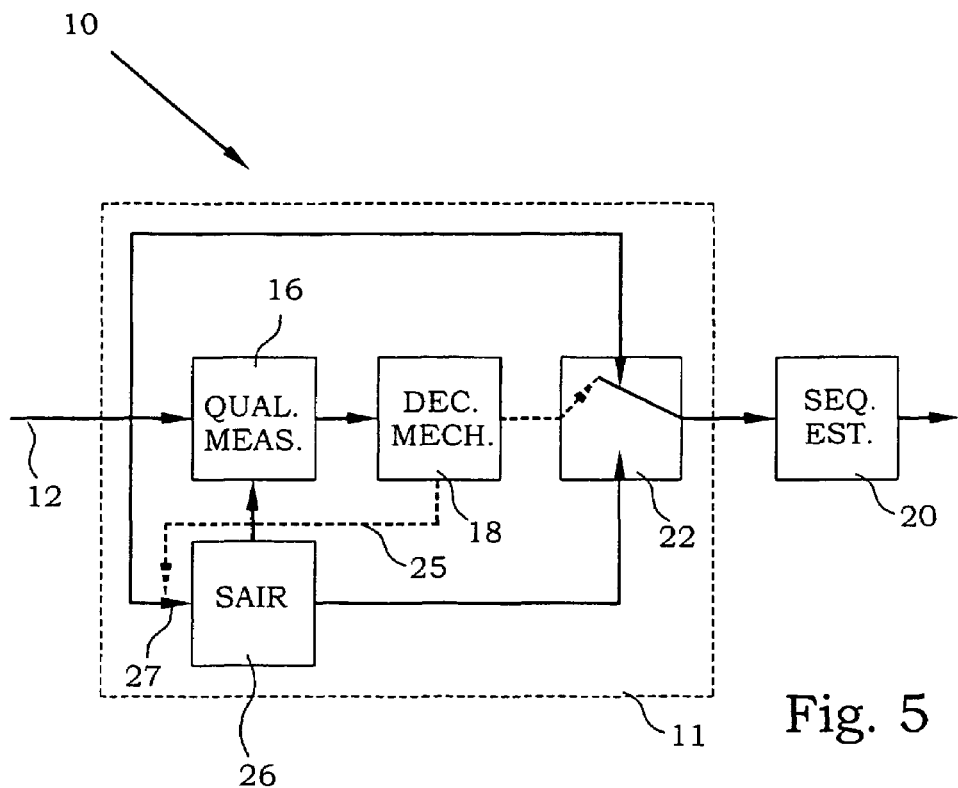
FIG. 5 is a block diagram of another embodiment of a receiver having one interference rejector.

A second embodiment of a receiver is illustrated in FIG. 5. It resembles the embodiment of FIG. 3 and similar parts are not discussed again. The essential difference is that also the originally received signal is provided to the quality measure detector 16. Subsequently, two quality measures are provided from the quality measure detector 16 to the decision mechanism 18. In the decision mechanism 18, the decision may now instead be based on e.g. the ratio between the quality measures. This means that if the original signal is essentially free from interference, the decision mechanism 18 may control the switch 22 to select the original signal. Any possible deterioration of the original signal is then avoided.

In the present embodiment, the receiver is furthermore arranged to let the decision mechanism 18 also control 25 the input 27 to the SAIR section 26. This design allows a first decision to be made entirely based on only the quality measure of the originally received signal. If that quality measure is good enough, no interference rejection at all will be employed. However, if the quality measure indicates that an interference is present, the original signal is provided to the SAIR section 26, in order for the interference rejection procedure to be performed. A second decision can then be made, based on e.g. a comparison between the quality measures of the manipulated and original signals, respectively. If a significant improvement is achieved, the SAIR manipulated signal is used. If not, the original signal is used anyway.

Figure 6:
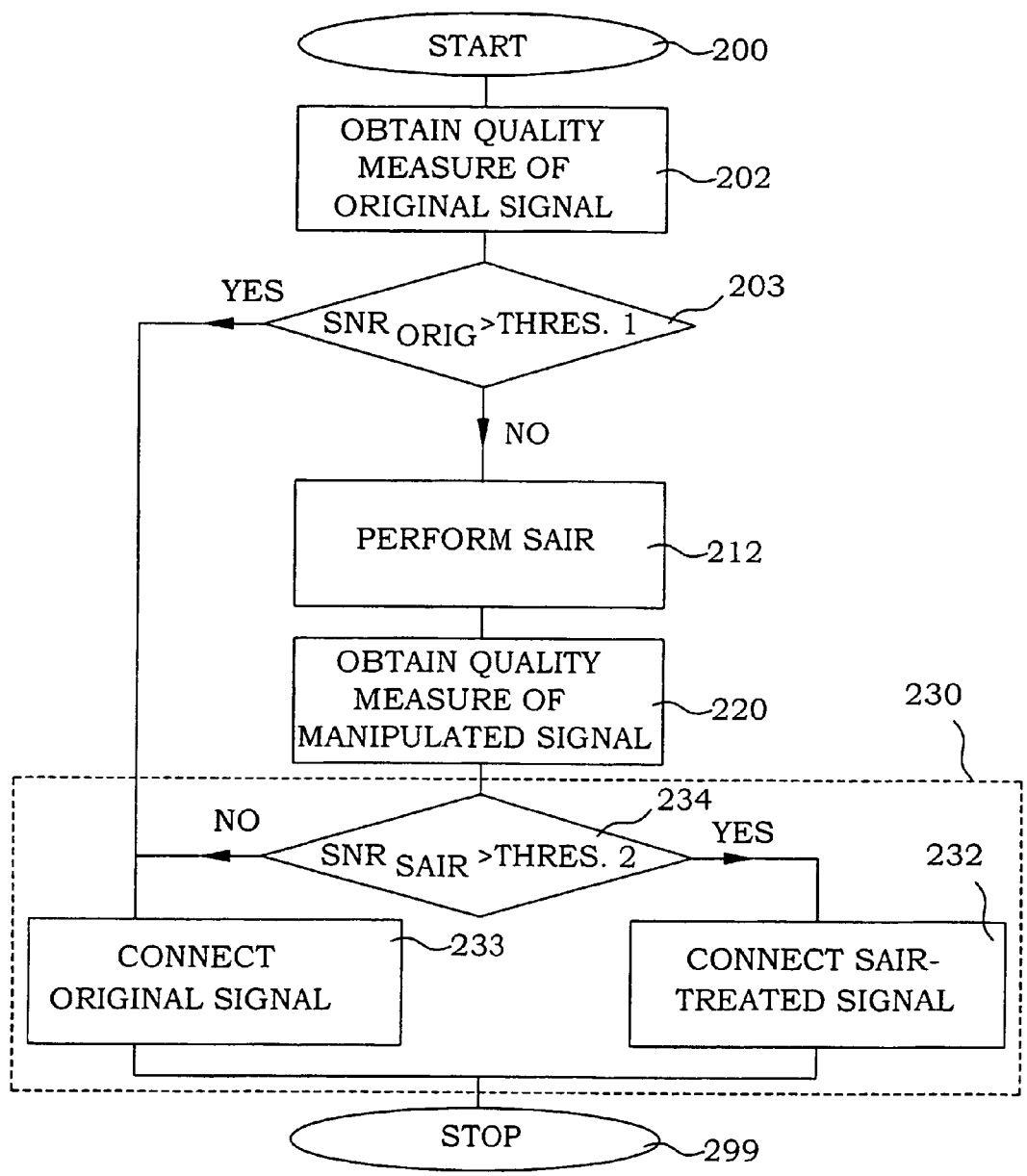
FIG. 6 is a flow diagram of an embodiment of a method used with the embodiment of FIG. 5.

A corresponding flow diagram is illustrated in FIG. 6. The procedure starts in step 200. In step 202, a quality measure of the original signal is obtained. If this quality measure is good enough, as judged in step 203, no interference rejection is necessary and the process continues to step 233. Otherwise the process continues to step 212. Steps 212 and 220 are essentially the same as in FIG. 4. In step 234, the decision regarding the necessity of SAIR processing may be based on either only the quality measure of the manipulated signal or on both quality measures. Remaining steps are similar as described above.

Figure 7:
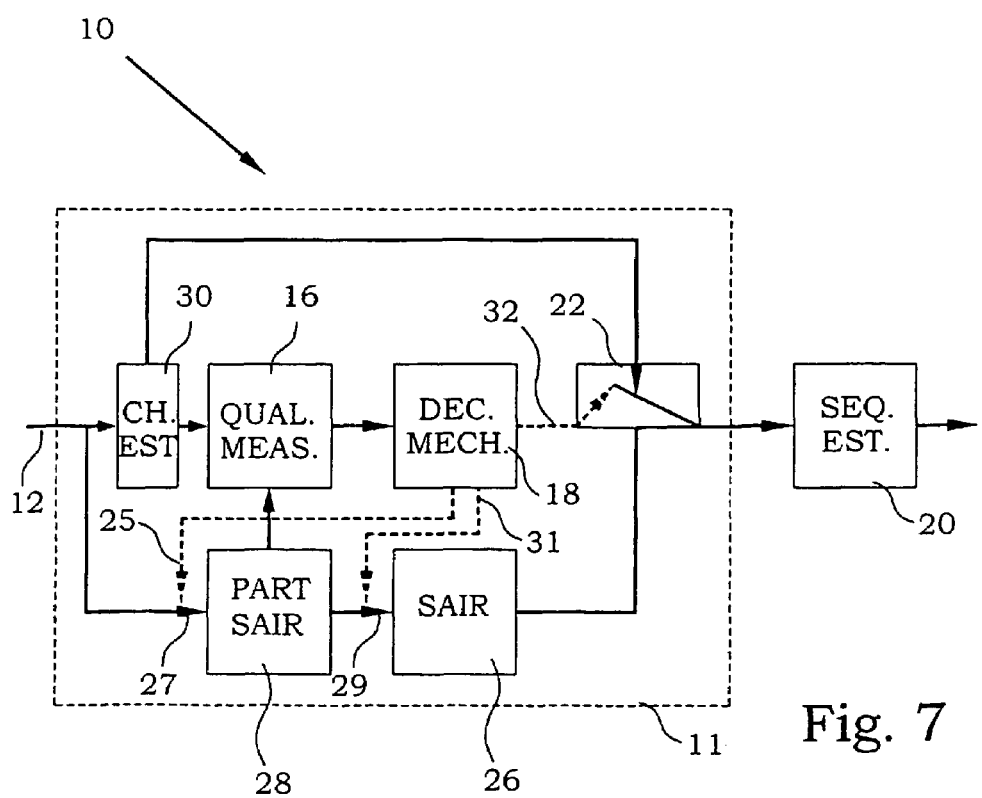
FIG. 7 is a block diagram of an embodiment of a receiver basing a strategy on the result of a partial interference rejection.

A third embodiment is illustrated in FIG. 7. This embodiment is intended to be used in an EDGE system, where the receiver comprises means for handling GMSK modulation. In an EDGE system, signals of either GMSK- or 8PSK-modulation are present. Furthermore, a training sequence is sent in connection with the digital data. The position of this sequence as well as the content is well known. This fact is used in the present embodiment to reduce unnecessary process power utilization. Instead of performing the "preliminary" interference rejection on the entire signal, the interference rejection is only performed on the training sequence. Furthermore, in this embodiment, the quality measure detector 16 detects the residual error of the signal after channel estimation. (Channel estimation is performed also in connection with the interference rejection.)

In FIG. 7, the received signal is thus provided to a partial SAIR section 28, where SAIR is employed over only the training sequence. The input is controlled by the decision mechanism 18 based on a quality measure of the original signal, when passed through a conventional channel estimation means 30. If an interferer is GMSK-modulated, employment of SAIR over the training sequence should give a considerably smaller residual error after channel estimation, compared to a conventional receiver. On the other hand, if the interferer is 8PSK-modulated, the difference should not be that significant. One objection could be that an 8PSK-modulated signal in EDGE utilizes the same training sequences as a GMSK-modulated signal, i.e. over the training sequence the modulation is binary (one-dimensional). However, the rotations of the GMSK- and 8PSK-modulated signals are different. The rotation for the GMSK signals is $\pi/2$, and for the 8PSK-signals $3\pi/8$. Hence, when the blind modulation detection (of the desired signal) detects a GMSK-modulated desired signal, it will be de-rotated $-\pi/2$. If the interferer signal then is 8PSK-modulated and aligned to the desired signal, it will still have rotation, and the residual error will consequently not be as small as if the interferer would have been GMSK-modulated.

The quality measures do not only bring information about the total impairment situation. From the quality measures, it is also possible to deduce information about e.g. the relative amount of noise compared with interference signals. Furthermore, by having additional knowledge about the system configuration, in this case that there are two basic modulation types (GMSK and 8PSK), it can also be concluded which type of modulation the interfering signal has.

If the decision mechanism 18 finds that the interferer has a GMSK modulation, SAIR is a suitable interference rejecting procedure, and the received signal is provided as input 29 to a SAIR section 26, for a total interference rejection of the entire signal. This is controlled 31 from the decision mechanism 18. The decision mechanism 18 will at the same time control 32 the switch 22 to disconnect the original signal. If the decision mechanism 18 finds that the interferer has an 8PSK modulation, the original signal is selected instead, and no total SAIR procedure has to be performed.

In this embodiment, the test SAIR procedure is only performed on a part of the signal, which reduces the amount of computational power that is wasted if the original signal is selected. Moreover, this test SAIR can be reused when or if the total SAIR is performed. The processor power of the SAIR is reduced, but the decision mechanism 18 becomes more complex.

It should be noted that, in general, most interference rejection methods always would give a smaller residual error than a conventional receiver would. Hence, a hypothesis test is generally needed in order to compare the errors. Several such tests are known in the literature, e.g. Akaike's Information Criterion (AIC) or variants thereof (BIC, CIC), Final Prediction Error (FPE) tests, F-tests, etc., or whatever hypothesis test. However, other simpler schemes are also possible, e.g. threshold schemes, as used in most embodiments throughout this disclosure. However, a threshold scheme might always be replaced by a more sophisticated hypothesis test, as the ones mentioned above. Anyway, in the present invention, if residual error after channel estimation RE is used as a quality measure, a threshold scheme could be designed as:

$$\text{if} \frac{RE_{IR}}{RE_{orig}} < \theta \quad \text{employ interference rejection}$$
$$\text{else} \quad \text{employ conventional methods.}$$

The setting of the threshold $\theta$ is a trade-off between the performance when the interference rejection method works good and poorly, respectively. If the value of the threshold is made larger, the more often interference rejection will be employed. The threshold can also be adaptive according to the residual error from the conventional receiver. If this estimate is low, a low threshold value is set, and vice versa. The performance of the threshold scheme is thus improved even further.

Figure 8:
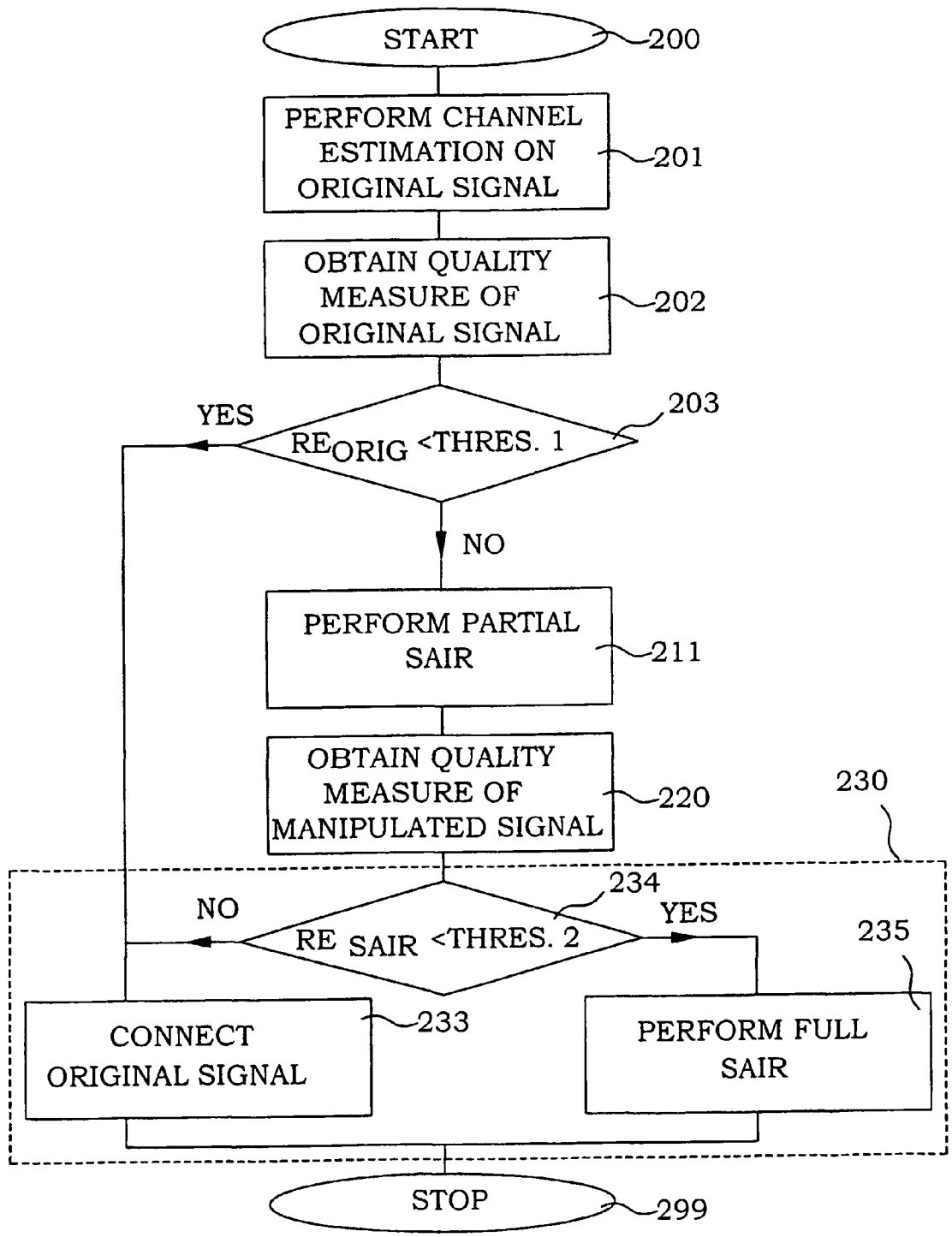
FIG. 8 is a flow diagram of an embodiment of a method used with the embodiment of FIG. 7.

A corresponding flow diagram of the embodiment in FIG. 7 is illustrated in FIG. 8. The procedure is very similar to the one in FIG. 6. In step 201 conventional channel estimation is performed and the quality measure in step 202 measures residual errors. In step 211, a SAIR procedure is performed on a part of the signal, in this embodiment, the training sequence. If the decision 234 regarding the necessity of SAIR processing concludes that SAIR is the suitable procedure, SAIR is performed on the entire signal in step 235. Other parts of the flow diagram are unaltered.

It should also be mentioned that the selection not necessarily must be between a powerful interference rejection method and means corresponding to a conventional receiver, it could also be between a powerful interference rejection method and another, perhaps less powerful, interference rejection method. For example, in the EDGE example above, the means corresponding to a conventional receiver could be replaced by means for a temporal whitening receiver, since the performance of the SAIR receiver in GMSK-modulated interference is outstanding also compared to a temporal whitening receiver. The selection could also be between two (or more) powerful interference rejection methods designed for certain purposes.

Figure 9:
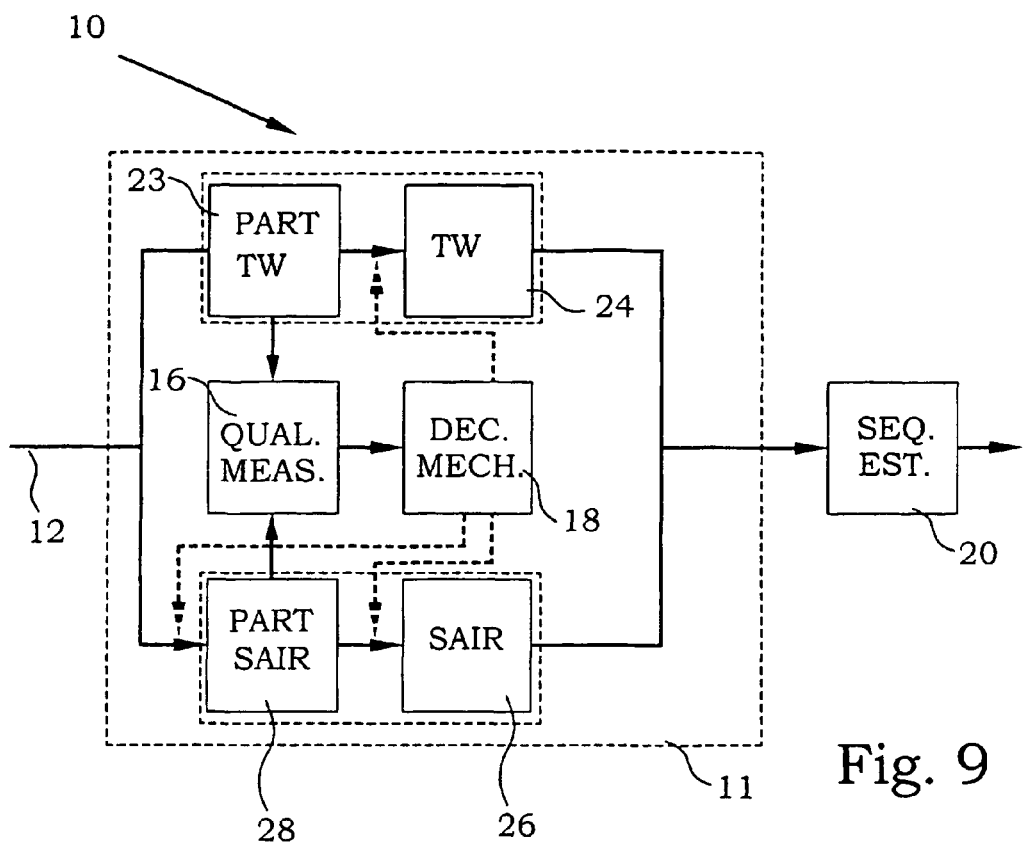
FIG. 9 is a block diagram of an embodiment of a receiver having two interference rejectors.

FIG. 9 illustrates an embodiment based on two different interference rejection methods. In this case, the estimated quality measure used in the quality measure detector 16 is a signal-to-noise ratio (SNR). The received signal is provided to a partial temporal whitening section 23, where the interference rejection is performed over the training sequence of the signal. The manipulated signal is provided to the quality measure detector 16. If the SNR is good enough, e.g. SNR is larger than a first threshold, the interference rejection seems to be adequate and the decision mechanism 18 allows the signal to be provided to a temporal whitening section 24, where the entire signal is treated. The manipulated total signal is then brought further in the receiver.

However, if the SNR falls below the threshold, it is not obvious that temporal whitening is the appropriate choice. Therefore, the received signal is provided to the partial SAIR section 28. As before, SAIR is performed over the training sequence, and a quality measure of the manipulated signal is obtained. The decision mechanism 18 uses e.g. the ratio between the quality measures for the two alternative interference rejection methods as an indication of the possibility to utilize respective method. One possibility could e.g. be:

$$\text{if} \frac{SNR_{SAIR}}{SNR_{TW}} > \theta \quad \text{employ SAIR interference rejection}$$
$$\text{else} \quad \text{employ temporal whitening.}$$

The partial and full interference rejection means, respectively, are illustrated as separate means, but may of course be integrated in one, as indicated by the broken boxes. The illustration as independent means is merely for facilitating the illustration of the events occurring during the procedure.

Figure 10:
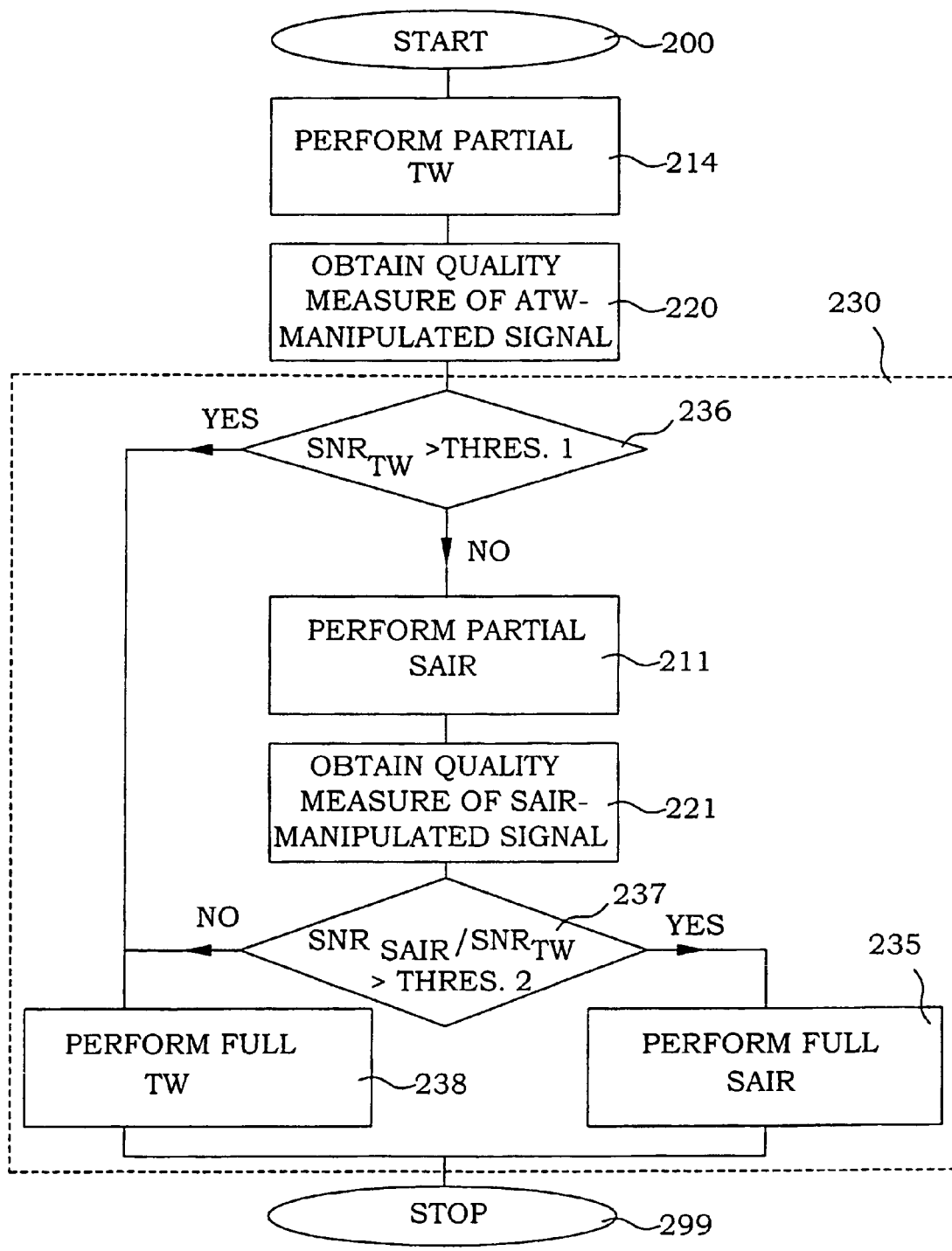
FIG. 10 is a flow diagram of an embodiment of a method used with the embodiment of FIG. 9.

A corresponding flow diagram is illustrated in FIG. 10. The procedure starts in step 200. In step 214, temporal whitening is performed on the training sequence of the signal. In step 220 a quality measure of the manipulated signal is obtained, in this embodiment a SNR. If this quality measure is good enough, as judged in step 236, temporal whitening is applied to the entire signal in step 238. However if the SNR is too low, an attempt to use SAIR is made. A SAIR procedure is performed on the training sequence in step 211 and in step 221, a quality measure of this manipulated signal is obtained. If, as decided in step 237 a ratio between $SNR_{SAIR}$ and $SNR_{TW}$ exceeds a certain threshold value, an SAIR procedure is performed for the entire signal in step 235. If the ratio is lower than the threshold, temporal whitening is anyway applied. The procedure ends in step 299. In this case, the steps 236, 211, 221, 237, 235 and 238 could be considered as equivalent to step 230 of FIG. 2.

The technology can also be extended to turn on/off more structures in the receiver. It is e.g. possible to have one structure for noise, one for a certain type of interference and yet another one for another type of interference. For our previous example with a GMSK-receiver in EDGE this could be accomplished by having one structure for noise (e.g. a conventional non-whitening receiver), one for GMSK-modulated interference (SAIR), and one for 8PSK-modulated interference (e.g. temporal whitening).

Figure 11:
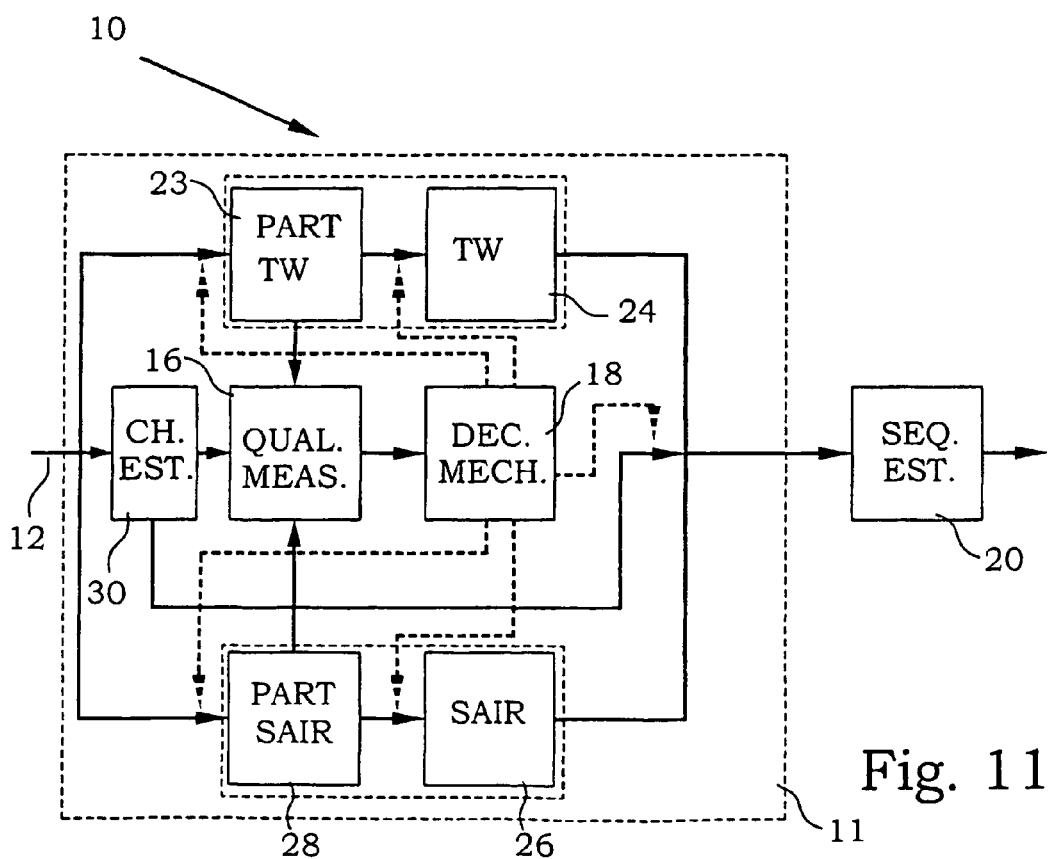
FIG. 11 is a block diagram of another embodiment of a receiver having two interference rejectors.

In this context, FIG. 11 illustrates another embodiment based on two different interference rejection methods, but where a conventional receiver technique also may be used. The received signal is synchronized and channel estimated according to conventional techniques. A quality measure of this signal is used for deciding if there is any need at all for interference rejection. Otherwise, the original signal is connected.

In case some interference rejection is needed, the original signal is in this particular embodiment provided in parallel to a partial temporal whitening section 23 and a partial SAIR section 24. The interference rejection is performed over the training sequence of the signal in each of the sections 23, 24 and quality measures are obtained for each of the manipulated signals. In this embodiment, a signal-to-noise ratio is estimated for the original signal $SNR_{orig}$. The decision mechanism 18 uses this measure. However, the quality measure detector 16 obtains values of residual errors for the original signal, the TW-treated signal as well as for the SAIR-treated signal. The decision mechanism 18 has now three quality measures to consider $RE_{orig}$, $RE_{SAIR}$ and $RE_{TW}$. Depending on the relative magnitudes, a decision can be made between refraining from any interference rejection, performing a SAIR procedure and performing temporal whitening.

Figure 12:
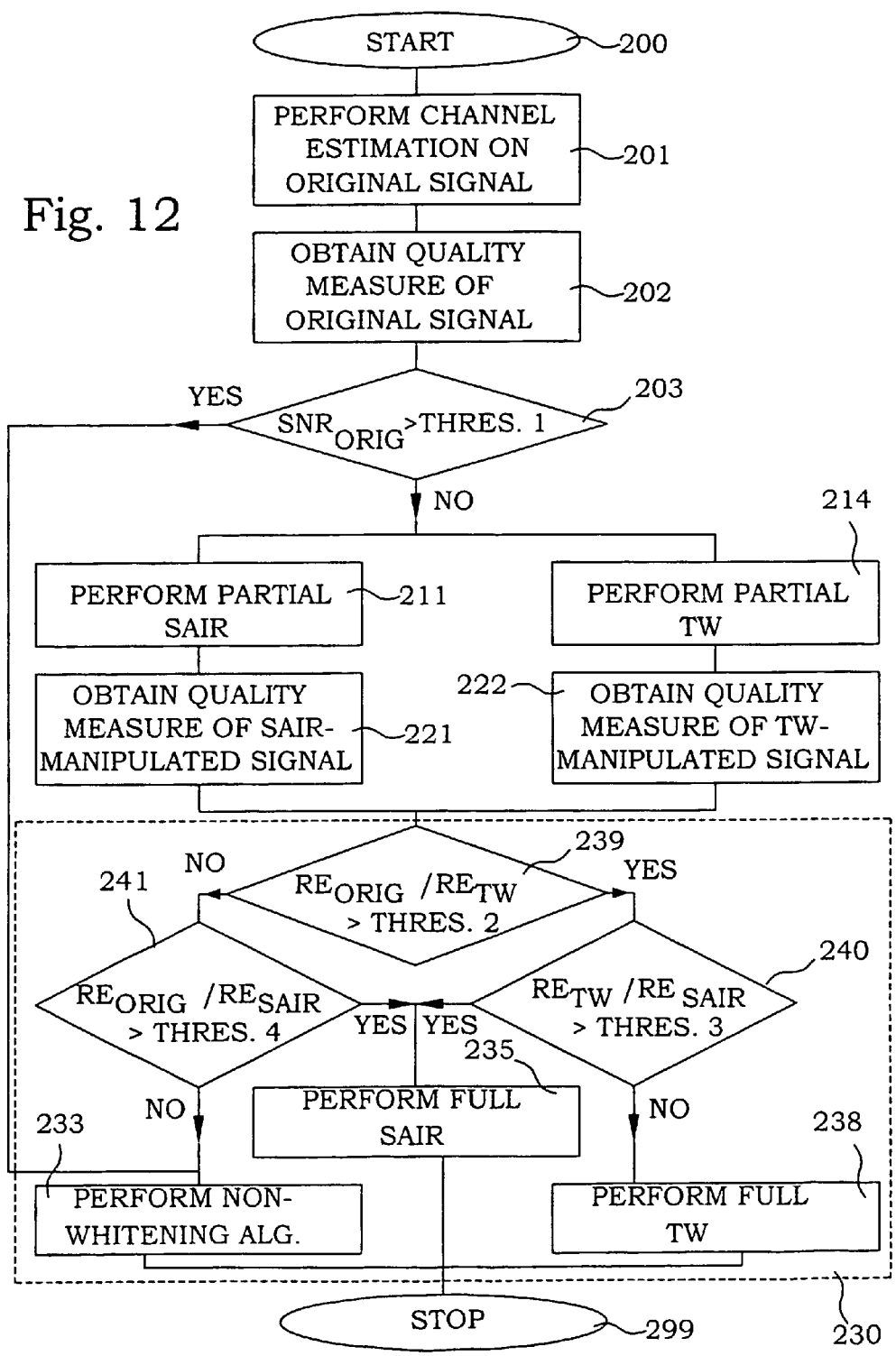
FIG. 12 is a flow diagram of an embodiment of a method used with the embodiment of FIG. 11.

This procedure is better understood by investigating the corresponding flow diagram, illustrated in FIG. 12. After the introduction (steps 201, 202, 203, 233), which is similar as in FIG. 8, it is decided whether an attempt to employ interference rejection should take place or not. If the $SNR_{orig}$ measure is too low, i.e. below a first threshold, preliminary interference rejections using temporal whitening and SAIR, respectively, over the training sequence is employed in steps 211 and 214, respectively. In steps 221, and 222, quality measures corresponding to these manipulated signals are obtained. In step 239, the relative magnitude between $RE_{TW}$ and $RE_{orig}$ is investigated, and if the ratio is below a second threshold, the procedure continues to step 240. If the ratio exceeds the second threshold, the procedure instead continues to step 241. In step 241, the relative magnitude between $RE_{SAIR}$ and $RE_{orig}$ is investigated. If the ratio is lower than a third threshold, SAIR is employed in step 235, otherwise the non-whitening procedure of step 233 is used. Similarly, in step 240, the relative magnitude between $RE_{SAIR}$ and $RE_{TW}$ is investigated. If the ratio exceeds a fourth threshold, TW is employed in step 238, otherwise SAIR is employed in step 235. The procedure ends in step 299.

Yet other embodiments could be to utilize it for having e.g. a certain structure for noise, another structure for co-channel interference and yet another structure for adjacent-channel interference. With combinations of different modulations the number of structures can be even higher, even though the design of the decision mechanism 18 gets more difficult when the number of structures increases.

Above, a few examples of quality measures are given. However, also other types of quality measures are possible to use. Non-limiting examples could be signal-to-interference ratio, carrier-to-noise ratio, carrier-to-interference ratio, carrier-to-noise-plus-interference ratio, received signal strength, soft values, dominant interference ratio, dispersion, Doppler spread, bit-error-rate, symbol-error-rate, frame-erasure-rate, cyclic redundancy code, frequency offset, symbol mis-alignment, or a combination thereof. The quality measure may also be an estimate of any of the previously mentioned quality measures or a combination thereof.

The quality measure that is utilized to design the decision mechanism 18 does not necessarily have to be obtained after channel estimation or over the training sequence. It can for example also be obtained after sequence estimation/equalization/detection instead, as some of the examples given above, and/or over the whole burst/signal. It can also be obtained over several bursts, which in certain cases can give better quality measures/estimates and also facilitate the impairment detection. This may e.g. be implemented by moving averaging of quality measures.

Benefits of the above technology are that interference rejection gains in the interference scenarios the interference rejection method was designed for are still achieved, while the performance is not degraded in other scenarios. In these cases, a conventional receiver or another structure designed for that certain scenario is employed.

Figure 13:
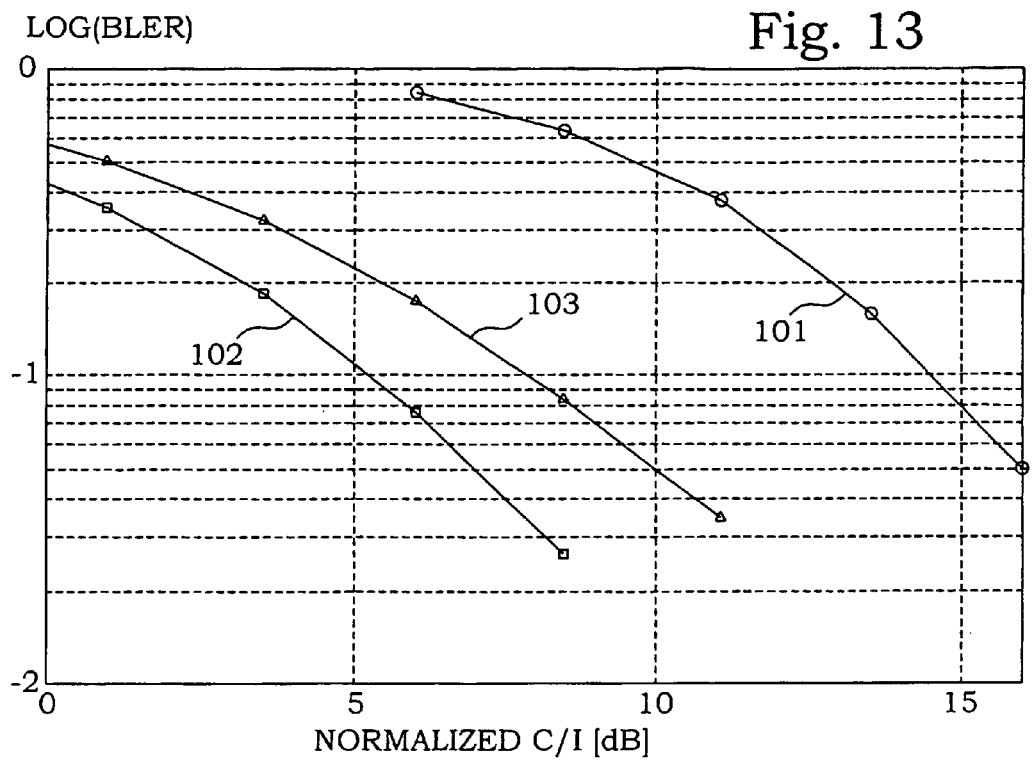
FIG. 13 is a diagram illustrating the efficiency of prior art interference rejections and interference rejection, respectively, in a GSM/EDGE system when both the desired signal and the interferer are GMSK modulated.
Figure 14:
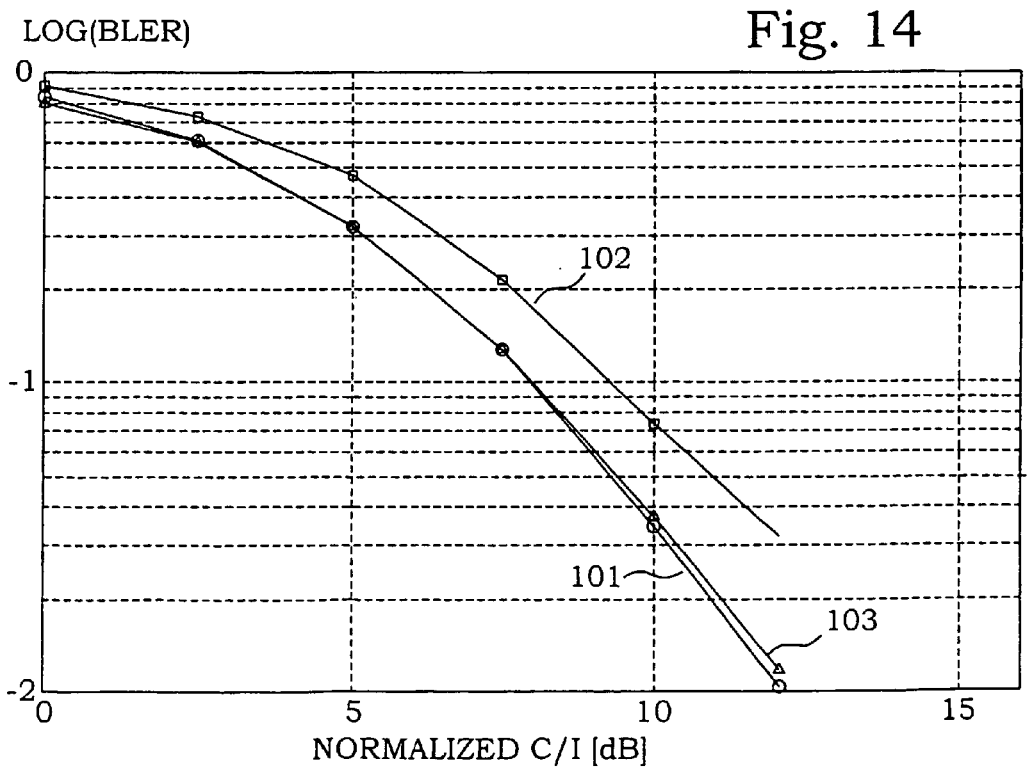
FIG. 14 is a diagram illustrating the efficiency of prior art interference rejections and interference rejection, respectively, in a GSM/EDGE system when the desired signal is GMSK modulated and the interferer 8PSK modulated.

To illustrate the benefits, EDGE simulation results are presented. The desired signal is GMSK-modulated. FIGS. 13 and 14 show results when the interferer is GMSK- and 8PSK-modulated, respectively. The performance of three receivers are shown, first a conventional receiver 101, then a pure SAIR receiver 102, and finally a receiver 103 equipped with the new invention in order to turn on/off SAIR. For the SAIR receiver 102, it can be seen that it gives a large gain over the conventional receiver 101 in GMSK-modulated interference, but a degradation in 8PSK-modulated interference. With the new invention the degradation in 8PSK-modulated interference is eliminated, while still retaining a large part of the gain in GMSK-modulated interference.

Figure 15:
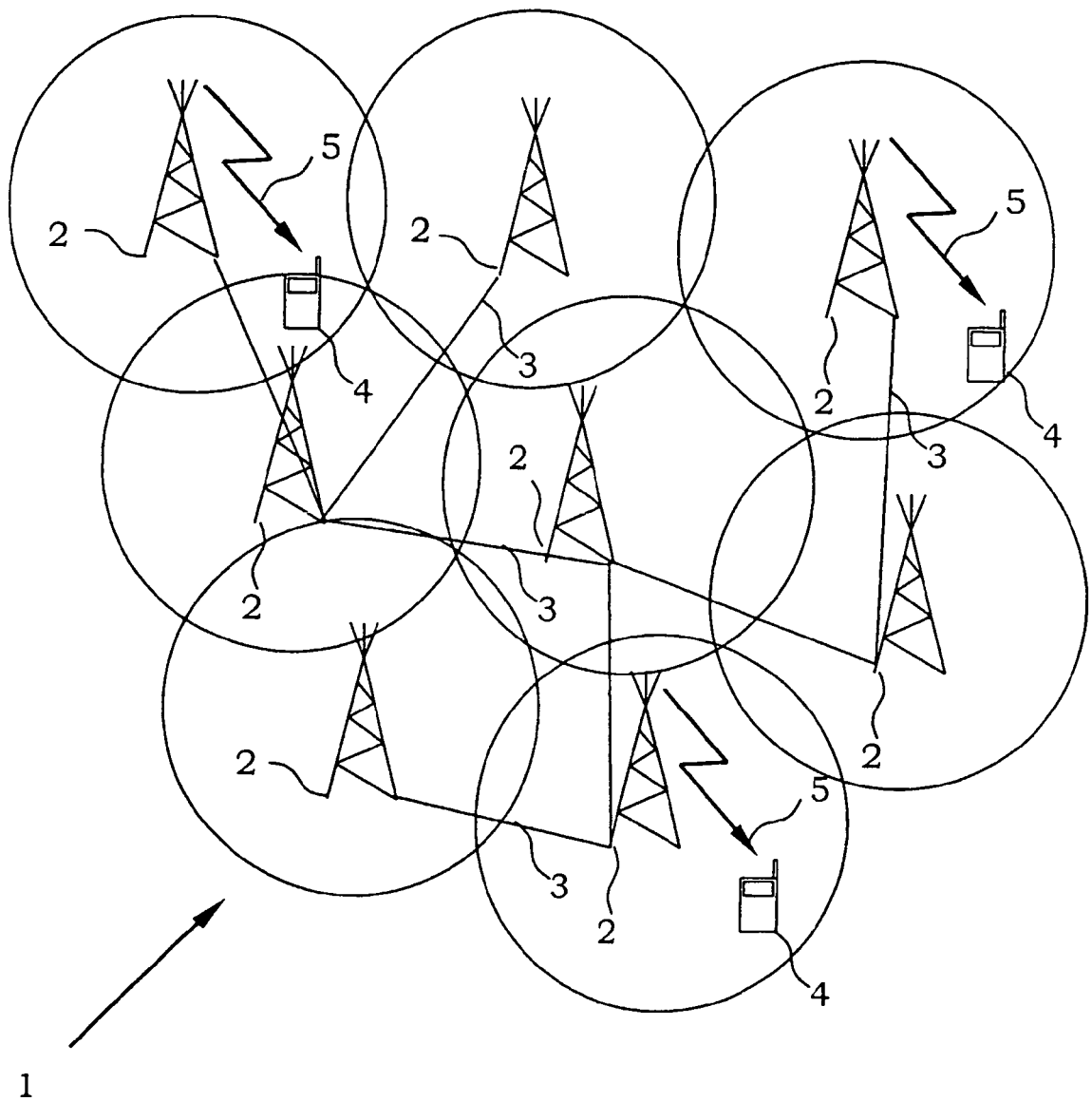
FIG. 15 is a block diagram of a wireless communication system.

FIG. 15 illustrates a typical wireless communication system 1, in this embodiment using the GSM/EDGE principles. Base stations 2 are connected 3 in a radio access network, and mobile units 4 communicate with the base stations 2 via radio signals 5. The radio signals 5 of different connections may interfere with each other, either between adjacent cells (adjacent cell interference) or within the same cell (co-channel interference). Signals received in the mobile units 4 as well as the base stations 2 may be affected by such interference. Furthermore, other type of noise may occur. The present invention is applicable at both sides of the radio interface, i.e. both in the mobile units 4 and in some node in the radio access network. Non-excluding examples of such nodes are base stations and node B's.

In the above discussions, a number of modulation methods have been discussed. The technology presented is, however, not limited to these modulation methods, but is applicable to any modulation, with corresponding changes in interference rejection principles.

Also, a number of specified interference rejection principles have been discussed. Other conventional or future interference rejection schemes can also be used according to the main characters of the present invention. Non-excluding examples are temporal whitening, single antenna interference rejection (SAIR), maximum ratio combining (MRC), interference rejection combining (IRC), spatial whitening, and spatio-temporal whitening, etc.

Finally, even if GSM/EDGE systems are discussed here above, the present invention is more generally applicable to a variety of receivers in different types of communication systems. Non-excluding examples are different wireless communication systems, e.g. GSM/GPRS/EDGE as well as different wireline and satellite communication systems.

It will be understood by those skilled in the art that various modifications and changes may be made. The invention is defined in the appended claims.

REFERENCES

[1] H Arslan and K Molnar. Co-channel interference suppression with successive cancellation in narrow-band systems. In IEEE Communications Letters, vol. 5, issue 2, February 2001.

[2] H Arslan et al. New approaches to adjacent channel interference suppression in FDMA/TDMA mobile radio systems. In IEEE Transactions on Vehicular Technology, vol. 49, issue 4, July 2000.

[3] D Hui and K Zangi. An Adaptive Maximum-Likelihood Receiver for Colored Noise and Interference. In Proceedings of the 54th IEEE Vehicular Technology Conference, 2001.

[4] G E Bottomley and K Jamal. Adaptive Arrays and MLSE Equalization. In Proceedings of the 45th IEEE Vehicular Technology Conference, 1995.
[5] J Karlsson and J Heinegård. Interference Rejection Combining for GSM. In 5th IEEE International Conference on Universal Personal Communications Record, 1996.
[6] D Asztely and B Ottersten. MLSE and Spatio-Temporal Interference Rejection Combining with Antenna Arrays. In Proceedings of EUSIPCO-98, Ninth European Signal Processing Conference, 1998.
[7] WO 00/64061.
[8] P A Laurent, Exact and Approximate Construction of Digital Phase Modulations by Superposition of Amplitude Modulated Pulses (AMP). IEEE Transactions on Communications, Vol. 34, February 1986.
[9] P Jung. Laurent's Representation of Binary Digital Continuous Phase Modulated Signals with Modulation Index 1/2 Revisited. IEEE Transactions on Communications, Vol. 42, February/March/April 1994.
[10] WO 02/23742.

The invention claimed is:

1. Method for interference rejection on a signal, the method being performed in a receiver and comprising the steps of:
the receiver performing a first interference rejection procedure on a first portion of a signal, giving a first manipulated signal, said first portion being less than an entirety of said signal;
the receiver determining a first post-rejection signal quality measure of said first manipulated signal;
wherein a remaining portion of said signal, which does not overlap with said first portion, remains untreated by said first interference rejection procedure during said performing step and said determining step; and
the receiver following an interference rejection strategy in response to said first post-rejection signal quality measure including:
performing said first interference rejection procedure on the entirety of said signal when a first criterion based on said first post-rejection signal quality measure is fulfilled,
performing a second interference rejection procedure on said first portion of the signal, giving a second manipulated signal, when said first criterion is not fulfilled;
determining a second post-rejection signal quality measure of said second manipulated signal; and
performing one of the first interference rejection procedure and the second interference rejection procedure on the entirety of said signal in response to said second post-rejection signal quality measure.

2. Method according to claim 1, wherein said step of following an interference rejection strategy in turn comprises the step of:
refraining from any interference rejection when the first criterion based on said first post-rejection signal quality measure is fulfilled.

3. Method according to claim 1, wherein said step of following an interference rejection strategy comprises the further step of:
performing the second interference rejection procedure on said signal, when a second criterion based on said first post-rejection signal quality measure is fulfilled.

4. Method according to claim 1, wherein said step of performing an interference rejection procedure in response to said second post-rejection signal quality measure in turn comprises the step of:
performing said second interference rejection procedure on the entire of said signal, when a third criterion based on said second post-rejection signal quality measure is fulfilled.

5. Method according to claim 1, wherein said step of performing an interference rejection procedure in response to said second post-rejection signal quality measure in turn comprises the step of:
performing said first interference rejection procedure on the entire of said signal, when a third criterion based on said second post-rejection signal quality measure is fulfilled.

6. Method according to claim 1, wherein said step of performing an interference rejection procedure in response to said second post-rejection signal quality measure in turn comprises the step of:
refraining from using any interference rejection procedure on said signal, when a third criterion based on said second post-rejection signal quality measure is fulfilled.

7. Method according to claim 4, wherein said third criterion is further based on said first post-rejection signal quality measure.

8. Method according to claim 1, wherein said first interference rejection procedure is less powerful than said second interference rejection procedure.

9. Method according to claim 1, wherein said first portion of said signal is a training sequence of said signal.

10. Method according to claim 1, wherein said first post-rejection signal quality measure is selected from the list of:
residual errors after channel estimation;
signal-to-noise ratio;
signal-to noise-plus-interference ratio;
signal-to-interference ratio;
carrier-to-noise ratio;
carrier-to-interference ratio;
carrier-to-noise-plus-interference ratio;
received signal strength;
soft values;
dominant interference ratio;
dispersion;
Doppler spread;
bit-error-rate;
symbol-error-rate;
frame-erasure-rate;
cyclic redundancy code;
frequency offset; and
mis-alignment,
or estimates or combinations thereof.

11. Method according to claim 1, wherein said quality measure is based on more than one burst.

12. Method according to claim 1, wherein at least one of said first interference rejection procedure and said second interference rejection procedure is selected from the list of:
temporal whitening;
single antenna interference rejection (SAIR);
maximum ratio combining (MRC);
interference rejection combining (IRC);
spatial whitening; and
spatio-temporal whitening.

13. Method according to claim 1, comprising the further step of determining a type of impairment of said signal, whereby said type of impairment is utilized in selecting adequate interference rejection strategy.

14. Method according to claim 1, comprising the further step of determining an interferer modulation of said signal, whereby said interferer modulation is utilized in selecting adequate interference rejection strategy.

15. Method according to claim 1, wherein at least one of said criteria is based on a scheme selected from the list of:
- hypothesis test;
- threshold scheme; and
- threshold scheme adapted to at least one of said first and second quality measures.

16. Method according to claim 1, wherein said signal is a signal from a system of the list of:
- wireless communication system;
- wireline communication system; and
- satellite communication system.

17. Method for interference rejection on a signal, the method being implemented in a receiver and comprising the steps of:
- the receiver performing a first interference rejection procedure on a first portion of a signal, giving a first manipulated signal, said first portion being less than the entirety of said signal;
- the receiver determining a first post-rejection signal quality measure of said first manipulated signal;
- wherein a remaining portion of said signal, which does not overlap with said first portion, remains untreated by said first interference rejection procedure during said performing step and said determining step;
- the receiver performing a second interference rejection procedure on said first portion of a signal, giving a second manipulated signal;
- the receiver determining a second post-rejection signal quality measure of said second manipulated signal; and
- the receiver following an interference rejection strategy in response to said first post-rejection signal quality measure and to said second post-rejection signal quality measure including performing said first interference rejection procedure on the entirety of said signal when a first criterion based on said first and second post-rejection signal quality measures is fulfilled.

18. Method according to claim 17, wherein said step of following an interference rejection strategy in turn comprises the step of:
- performing said second interference rejection procedure on the entire of said signal, when the first criterion based on said first and second post-rejection signal quality measures is fulfilled.

19. Method according to claim 17, wherein said step of following an interference rejection strategy in turn comprises the step of:
- refraining from any interference rejection when the first criterion based on said first and second post-rejection signal quality measures is fulfilled.

20. A mobile unit arranged for wireless communication, comprising:
- receiver arranged for receiving a signal;
- a processor connected to said receiver;
- said processor comprising:
    - a first interference rejector;
    - a signal quality detector, connected to said first interference rejector;
    - a control section, connected to said first interference rejector and said signal quality detector; and
    - a second interference rejector, connected to said control section and said signal quality detector;
- said control section being further arranged to cause said first interference rejector to operate on a first portion of said signal and to provide an output thereof to said signal quality detector, said first portion being less than entire said signal;
- wherein a remaining portion of said signal, which does not overlap with said first portion, remains untreated during operation of said signal quality detector on said output of said first interference rejector;
- said control section being further arranged to cause said second interference rejector to operate on said first portion of said signal and to provide an output thereof to said signal quality detector;
- wherein said control section is further arranged to follow an interference rejection strategy in response to an output of said signal quality detector.

21. Mobile unit according to claim 20, wherein a procedure of said first interference rejector is less powerful than a procedure of said second interference rejector.

22. Mobile unit according to claim 20, wherein said signal quality detector is connected to said receiver allowing for signal quality detection of an output thereof.

23. Mobile unit according to claim 20, wherein said control section comprises means for performing a selection of a suitable interference rejection procedure based on output signals from said signal quality detector.

24. Mobile unit according to claim 23, wherein said control section comprises means for performing said selection according to a scheme selected from the list of:
- hypothesis test;
- threshold scheme; and
- threshold scheme adapted to output signals from said signal quality detector.

25. Mobile unit according to claim 20, wherein said first portion of said signal is a training sequence of said signal.

26. Mobile unit according to claim 20, wherein said signal quality detector provides at least one signal quality measure from the list of:
- residual errors after channel estimation;
- signal-to-noise ratio;
- signal-to noise-plus-interference ratio;
- signal-to-interference ratio;
- carrier-to-noise ratio;
- carrier-to-interference ratio;
- carrier-to-noise-plus-interference ratio;
- received signal strength;
- soft values;
- dominant interference ratio;
- dispersion;
- Doppler spread;
- bit-error-rate;
- symbol-error-rate;
- frame-erasure-rate;
- cyclic redundancy code;
- frequency offset; and
- mis-alignment, or estimates or combinations thereof.

27. Mobile unit according to claim 20, wherein at least one of said first interference rejector and said second interference rejector is selected from the list of:
- temporal whitening interference rejector;
- single antenna interference rejection (SAIR);
- maximum ratio combining (MRC);
- interference rejection combining (IRC);
- spatial whitening; and
- spatio-temporal whitening.

28. Mobile unit according to claim 20, wherein said control section being further arranged to determine a type of impairment of said signal, whereby knowledge about said type of impairment is utilized in selecting adequate interference rejection strategy.

29. Mobile unit according to claim 20, wherein said control section being further arranged to determine an interferer modulation of said signal, whereby knowledge about said interferer modulation is utilized in selecting adequate interference rejection strategy.

30. Mobile unit according to claim 20, wherein said mobile unit is a mobile unit for wireless communication or satellite communication.

31. A node for use in a communication system, comprising:
a receiver arranged for receiving a signal;
a processor connected to said receiver;
said processor comprising:
- a first interference rejector;
- a signal quality detector, connected to said first interference rejector;
- a control section, connected to said first interference rejector and said signal quality detector; and
- a second interference rejector, connected to said control section and said signal quality detector;
- said control section being further arranged to cause said first interference rejector to operate on a first portion of said signal and to provide an output thereof to said signal quality detector, said first portion being less than entire said signal;
- wherein a remaining portion of said signal, which does not overlap with said first portion, remains untreated during operation of said signal quality detector on said output of said first interference rejector;
- said control section being further arranged to cause said second interference rejector to operate on said first portion of said signal and to provide an output thereof to said signal quality detector;
- wherein said control section is further arranged to follow an interference rejection strategy in response to an output of said signal quality detector.

32. Node according to claim 31, wherein a procedure of said first interference rejector is less powerful than a procedure of said second interference rejector.

33. Node according to claim 31, wherein said signal quality detector is connected to said receiver allowing for signal quality detection of an output thereof.

34. Node according to any of the claim 31, wherein said control section comprises means for performing a selection of a suitable interference rejection procedure based on output signals from said signal quality detector.

35. Node according to claim 34, wherein said control section comprises means for performing said selection according to a scheme selected from the list of:
- hypothesis test;
- threshold scheme; and
- threshold scheme adapted to output signals from said signal quality detector.

36. Node according to claim 31, wherein said first portion of said signal is a training sequence of said signal.

37. Node according to claim 31, wherein said signal quality detector provides at least one signal quality measure from the list of:
- residual errors after channel estimation;
- signal-to-noise ratio;
- signal-to noise-plus-interference ratio;
- signal-to-interference ratio;
- carrier-to-noise ratio;
- carrier-to-interference ratio;
- carrier-to-noise-plus-interference ratio;
- received signal strength;
- soft values;
- dominant interference ratio;
- dispersion;
- Doppler spread;
- bit-error-rate;
- symbol-error-rate;
- frame-erasure-rate;
- cyclic redundancy code;
- frequency offset; and
- mis-alignment, or estimates or combinations thereof.

38. Node according to claim 31, wherein at least one of said first interference rejector and said second interference rejector is selected from the list of:
- temporal whitening interference rejector;
- single antenna interference rejection (SAIR);
- maximum ratio combining (MRC);
- interference rejection combining (IRC);
- spatial whitening; and
- spatio-temporal whitening.

39. Node according to claim 31, wherein said control section being further arranged to determine a type of impairment of said signal, whereby knowledge about said type of impairment is utilized in selecting adequate interference rejection strategy.

40. Node according to claim 31, wherein said control section being further arranged to determine an interferer modulation of said signal, whereby knowledge about said interferer modulation is utilized in selecting adequate interference rejection strategy.

41. Node according to claim 31, wherein said node is a node of a system selected from the list of:
- wireless communication system;
- wireline communication system; and
- satellite communication system.

42. A communication system having a number of interconnected nodes, at least one of said number of interconnected nodes comprising:
a receiver arranged for receiving a signal;
a processor connected to said receiver;
said processor comprising:
- a first interference rejector;
- a signal quality detector, connected to said first interference rejector; and
- a control section, connected to said first interference rejector and said signal quality detector;
- a second interference rejector, connected to said control section and said signal quality detector;
- said control section being further arranged to cause said first interference rejector to operate on a first portion of said signal and to provide an output thereof to said signal quality detector, said first portion being less than entire said signal;
- whereby the portion of said entire signal not overlapping with said first portion remains untreated during operation of said signal quality detector on said output of said interference rejector;
- wherein said control section is further arranged to cause said second interference rejector to operate on said first portion of said signal and to provide an output thereof to said signal quality detector;
- wherein said control section is further arranged to follow an interference rejection strategy in response to an output of said signal quality detector.

43. Communication system according to claim 42, wherein said communication system is selected from the list of:
- wireless communication system,
- wireline communication system; and
- satellite communication system.

* * * * *

UNITED STATES PATENT AND TRADEMARK OFFICE
CERTIFICATE OF CORRECTION

PATENT NO. : 7,602,866 B2
APPLICATION NO. : 10/506035
DATED : October 13, 2009
INVENTOR(S) : Olsson et al.

It is certified that error appears in the above-identified patent and that said Letters Patent is hereby corrected as shown below:

Title Page 2, in Field (56), under "OTHER PUBLICATIONS", in Column 2, Line 3, delete "Lettes." and insert -- Letters, --, therefor.

Title Page 2, in Field (56), under "OTHER PUBLICATIONS", in Column 2, Line 12, delete "Swe3den," and insert -- Sweden, --, therefor.

Title Page 2, in Field (56), under "OTHER PUBLICATIONS", in Column 2, Line 16, delete "A3ztély et al, "MLSWE" and insert -- Asztély et al, "MLSE --, therefor.

In Fig. 2, Sheet 2 of 10, for Tag "230", in Line 1, delete "INTERF:" and insert -- INTERF. --, therefor.

In Fig. 4, Sheet 2 of 10, for Tag "231", in Line 1, delete "SNIR" and insert -- SNR --, therefor.

In Column 15, Line 40, in Claim 34, after "according to" delete "any of the".

Signed and Sealed this

Sixteenth Day of March, 2010

David J. Kappos
*Director of the United States Patent and Trademark Office*